(12) United States Patent
Yuki et al.

(10) Patent No.: US 10,158,683 B2
(45) Date of Patent: Dec. 18, 2018

(54) INFORMATION SHARING SYSTEM, RECORDING MEDIUM, AND INFORMATION SHARING METHOD THAT ENSURES SET AND CANCEL OF INFORMATION SHARING BY USER

(71) Applicant: Kyocera Document Solutions Inc., Osaka (JP)

(72) Inventors: Akira Yuki, Osaka (JP); Takahiro Minami, Osaka (JP); Daisuke Yoshida, Osaka (JP); Satoshi Kawakami, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 373 days.

(21) Appl. No.: 14/929,340

(22) Filed: Nov. 1, 2015

(65) Prior Publication Data

US 2016/0134669 A1    May 12, 2016

(30) Foreign Application Priority Data

Oct. 31, 2014 (JP) ................................. 2014-222617

(51) Int. Cl.
*H04W 4/08* (2009.01)
*H04L 29/06* (2006.01)
*H04W 4/80* (2018.01)

(52) U.S. Cl.
CPC ............. *H04L 65/403* (2013.01); *H04W 4/08* (2013.01); *H04W 4/80* (2018.02)

(58) Field of Classification Search
CPC ...... H04L 65/403; H04W 4/08; H04W 4/008; H04W 4/80
See application file for complete search history.

(56) References Cited

U.S. PATENT DOCUMENTS

| | | | |
|---|---|---|---|
| 2004/0025056 A1* | 2/2004 | Katsube | G06F 17/3089 726/7 |
| 2005/0289237 A1* | 12/2005 | Matsubara | H04L 67/104 709/232 |
| 2010/0014652 A1* | 1/2010 | Yasuda | H04M 3/36 379/196 |

(Continued)

FOREIGN PATENT DOCUMENTS

| | | |
|---|---|---|
| JP | 2006-197025 A | 7/2006 |
| JP | 2012-190404 A | 10/2012 |
| JP | 2013-183429 A | 9/2013 |

*Primary Examiner* — Daniel Samwel
(74) *Attorney, Agent, or Firm* — James Judge (57) ABSTRACT

An information sharing system includes a group management server and at least one terminal. The group management server includes a mark generating circuit that generates a group ID for uniquely identifying a group. The terminal includes a mark analysis circuit that analyzes the imaged mark; and a second communication control circuit that controls the second communication circuit to communicate with the group management server and the file server, and sends a request for the user ID stored in the second storage circuit based on the analysis results to join the group indicated by the group ID. The shared folder management circuit of the group management server set an access right for the received user ID on the shared folder when receiving the request from the terminal.

7 Claims, 9 Drawing Sheets

(56) References Cited

U.S. PATENT DOCUMENTS

| | | | | |
|---|---|---|---|---|
| 2014/0100931 A1* | 4/2014 | Sanchez | ............... | G06Q 20/40 705/14.23 |
| 2014/0164517 A1* | 6/2014 | Valdetaro | ............ | H04L 63/0281 709/204 |
| 2014/0258334 A1* | 9/2014 | Mukasa | .............. | G06F 21/6218 707/781 |

* cited by examiner

INFORMATION SHARING SYSTEM, RECORDING MEDIUM, AND INFORMATION SHARING METHOD THAT ENSURES SET AND CANCEL OF INFORMATION SHARING BY USER

INCORPORATION BY REFERENCE

This application is based upon, and claims the benefit of priority from, corresponding Japanese Patent Application No. 2014-222617 filed in the Japan Patent Office on Oct. 31, 2014, the entire contents of which are incorporated herein by reference.

BACKGROUND

Unless otherwise indicated herein, the description in this section is not prior art to the claims in this application and is not admitted to be prior art by inclusion in this section.

Various techniques has been used to ensure an appropriate sharing of information such as a document with users as participants who have attended a meeting or with users within a group for a project implementation.

For example, there is provided a technique that captures a business card of the user to whom a different access right is desired to be granted together with an identification code (QR code (registered trademark)) of an image desired to be set the access right on and grants different access privileges to the user identified by the business card corresponding to an arrangement position within the captured image.

Another technique employs the QR code for easily distributing electronic data to a large count of unspecified audience in a lecture hall without advance preparation. The electronic data desired to be distributed is encoded as the QR code to be projected on a screen with a projector. The audience captures the QR code with a device such as a camera-equipped mobile phone. The captured QR code is decoded into the electronic data.

Yet another technique enables secure interconnection and resource sharing between devices belong to predetermined groups. For the interconnection and the resource sharing, for example, an administrator creates and prints the QR code to distribute the printed QR code to the students. The QR code contains the information of a student ID number, a password, and an address of a group management server.

The student who has received the QR code, scans the QR code with his or her mobile phone (cellular mobile station) and connects to the group management server based on the address contained in the QR code. After connection to the group management server, the mobile phone acquires a pair of public key and private key, and a digital certificate for a personal computer (PC) or a device which the student uses, and transmits them to the PC with short-range wireless communication.

SUMMARY

An information sharing system according to an aspect of the disclosure includes a group management server and at least one terminal. The group management server includes a first storage circuit, a first communication circuit, a mark generating circuit that generates a group ID for uniquely identifying a group so as to cause the first storage circuit to store the group ID and generates a mark containing at least the group ID, an address of the group management server, and the address of a file server as optically readable information, based on an instruction from an administrator that creates the group sharing a shared folder on the file server; a mark output control circuit that controls output of the generated mark; a first communication control circuit that controls the first communication circuit to communicate with the at least one terminal and the file server; a group management circuit that manages the generated group; and a shared folder management circuit that manages an access right of the shared folder shared by the group. The terminal includes: an imaging circuit; a display circuit; an operation input circuit; a second storage circuit that stores a user ID for uniquely identifying a user of the terminal; a second communication circuit; an imaging control circuit that causes the imaging circuit to image the outputted mark based on the instruction provided by the user via the operation input circuit; a mark analysis circuit that analyzes the imaged mark; an icon creation circuit that creates an icon containing at least the group ID, the address of the group management server, and the address of the file server as the optically readable information, based on the analysis results; a display control circuit that displays the created icon on a screen of the display circuit; and a second communication control circuit that controls the second communication circuit to communicate with the group management server and the file server, and sends a request for the user ID stored in the second storage circuit based on the analysis results to join the group indicated by the group ID. The group management circuit of the group management server associates the received user ID with the group ID stored in the first storage circuit to manage the user ID when receiving the request from the terminal. The shared folder management circuit of the group management server set an access right for the received user ID on the shared folder when receiving the request from the terminal.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings.

Outline

First, an outline of an embodiment of the disclosure will be described. According to the embodiment, a mark such as a two-dimensional bar code and a dot pattern is employed as a method to share electronic information by a member of a specific group. The electronic information is stored within a shared folder provided on a file server. The mark contains the information required for sharing as optically readable information.

The mark is projected on a screen by a projector, printed on a printed matter, and displayed on a screen of a mobile terminal. And then, the projected, printed, or displayed mark is imaged by an imaging unit (imaging circuit) of the mobile terminal. This consequently controls a user who has imaged joining the specific group, and granting an access right to the shared folder that can be used depending on a user who joins the specific group.

The imaged mark is duplicated as an icon to be displayed on the screen of the mobile terminal that has imaged. The icon contains the information required for sharing as the optically readable information. Imaging the displayed icon with the mobile terminal that belongs to any other user enables this user to join the group as well.

The user can easily access to the shared folder by performing an operation such as to drag and drop files or similar data on the screen with respect to the icon.

The user can easily leave the group indicated by the icon and revoke the access right to the shared folder by deleting the icon that is displayed on the screen and represents the specific group.

The user who desires to join and leave the specific group and to obtain and remove the access right to the shared folder, can perform the intended processes by only capturing the mark, deleting the icon on the screen, or similar operation.

Up to this point, the outline of the embodiment of the disclosure has been described.

Overall Configuration

Figure 1:
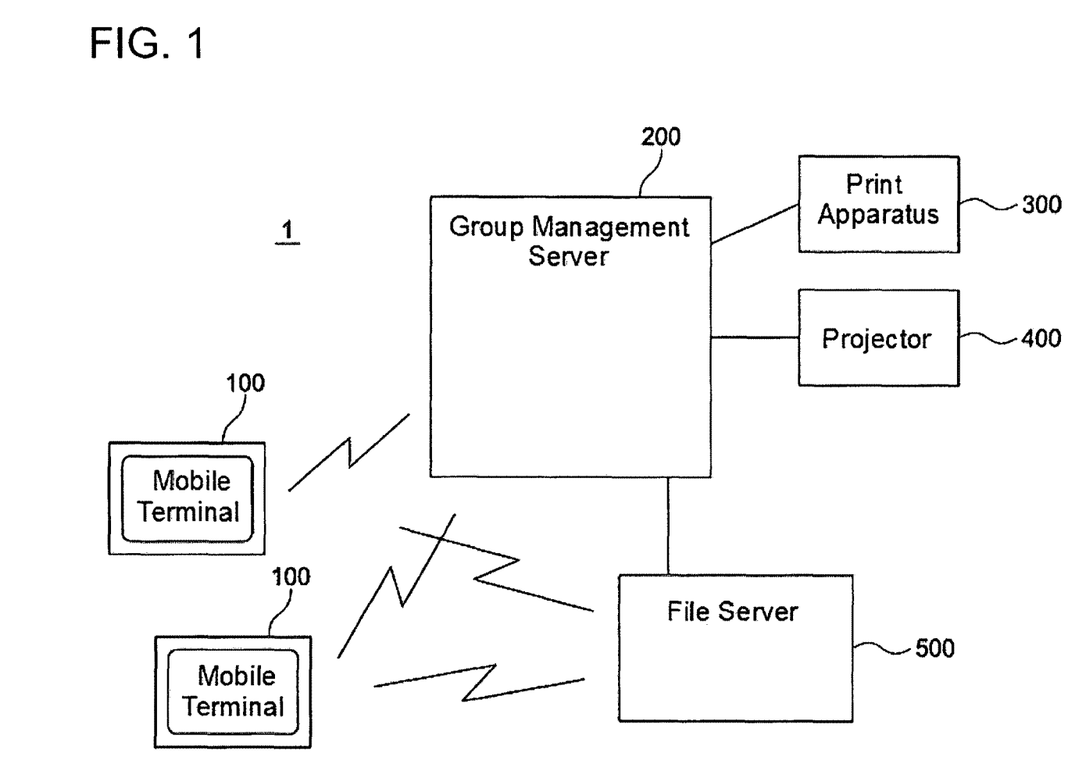
FIG. 1 illustrates a configuration of an entire information sharing system according to an embodiment of the disclosure.

Next, a configuration of an entire information sharing system according to the embodiment of the disclosure will be described. FIG. 1 illustrates a configuration of an entire information sharing system 1 according to the embodiment of the disclosure.

The information sharing system 1 includes at least one mobile terminal 100 and a group management server 200.

The group management server 200 may be connected to a print apparatus 300 for print of the mark or a projector 400 for projection of the mark on the screen.

The mobile terminal 100 and the group management server 200 are capable of communicating with a file server 500 via one of a wired network and a wireless network. The file server 500 provides the shared folder for sharing the electronic information.

Each mobile terminal 100 belongs to the user who joins the specific group. The user operates the mobile terminal 100 to join and leave the group.

The group management server 200 generates the mark to output, and accepts a request to join the group from the mobile terminal 100 to manage the users constituting the group.

The print apparatus 300 may employ any typical print apparatus capable of printing the mark. The functions of the group management server 200 and the print apparatus 300 may be collectively arranged in a single image forming apparatus (Multifunction Peripheral, abbreviated as MFP).

The projector 400 may employ any typical projector capable of projecting the mark on the screen.

The file server 500 may employ any general-purpose file server capable of; creating the shared folder and setting an access right based on an instruction from the group management server 200, and handling the access from the respective mobile terminal 100 appropriately.

Up to this point, the configuration of the entire information sharing system according to the embodiment of the disclosure has been described.

Configuration of Mobile terminal 100

Figure 2:
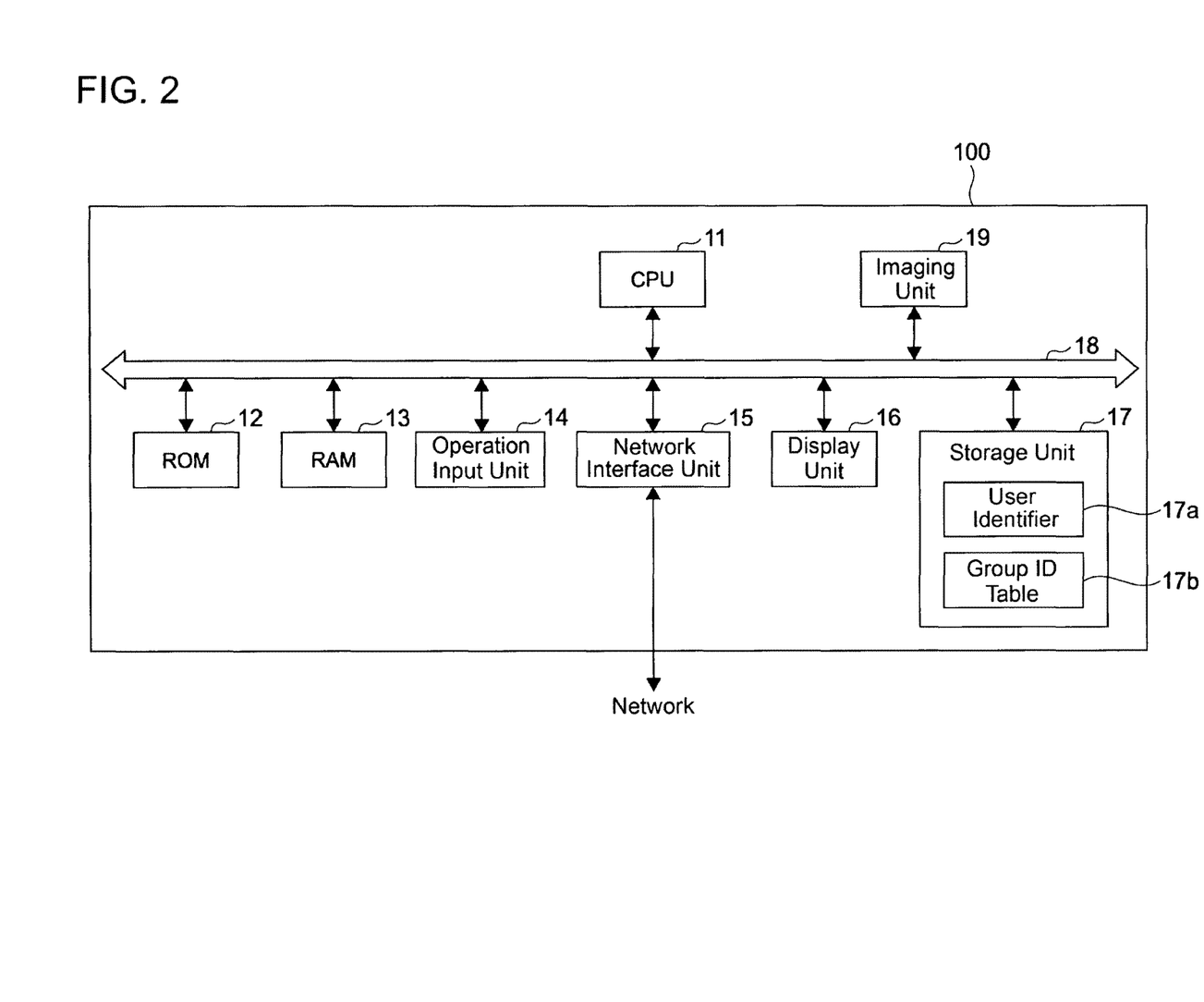
FIG. 2 illustrates a configuration for a mobile terminal constituted of a general-purpose computer.

Next, a configuration of the mobile terminal 100 will be described. The mobile terminal 100 may consists of dedicated hardware or software, and may also be constituted of a general-purpose computer. FIG. 2 illustrates a configuration for the mobile terminal 100 constituted of a general-purpose computer.

As illustrated in FIG. 2, the mobile terminal 100 includes a central processing unit (CPU) 11, a read only memory (ROM) 12, a random access memory (RAM) 13, an operation input unit 14, a network interface unit (second communication unit) 15, a display unit 16, a storage unit (second storage unit) 17, and an imaging unit 19. These blocks are each connected via a bus 18.

The ROM 12 stores a plurality of programs such as a firmware and data for performing the various processes. The RAM 13, which is used as a working area of the CPU 11, temporarily holds the Operating System (OS), the various applications running on, and the various data during processing.

The storage unit 17 is such as a hard disk drive (HDD), a flash memory, or an additional non-volatile memory. The storage unit 17 is a circuit that stores a user Identifier (ID) 17a and a group ID table 17b in addition to the OS, the various applications, and the various data.

The user ID 17a is an identifier for uniquely identifying the user having the mobile terminal 100 that stores the specific user ID 17a.

The group ID table 17b is a table to store a group ID of the group which the user having the mobile terminal 100 joins.

The network interface unit 15 is a circuit that is connected to the network for communicating the information with the group management server 200 and the file server 500.

The CPU 11 is an embodiment of a control unit that loads the program, which corresponds to an instruction provided by the operation input unit 14 among the plurality of programs stored in the ROM 12 and the storage unit 17, into the RAM 13, and then appropriately controls the display unit 16 and the storage unit 17 based on this loaded program. The control unit, which is a processor having one or more circuits, can load the various programs to execute and also can execute the various programs incorporated inside in advance. Here, the circuit may be an electronic component or an electronic substrate to which a plurality of electronic elements are connected through the wiring.

The operation input unit 14 is an operating device including a circuit that accepts an operation input, such as a pointing device such as a computer mouse, a keyboard, a touch panel, or an additional operating device.

The display unit 16 is a circuit, such as a liquid crystal display, an electroluminescence (EL) display, a plasma display, or a similar display. The imaging unit 19 is a circuit such as a camera.

Figure 3:
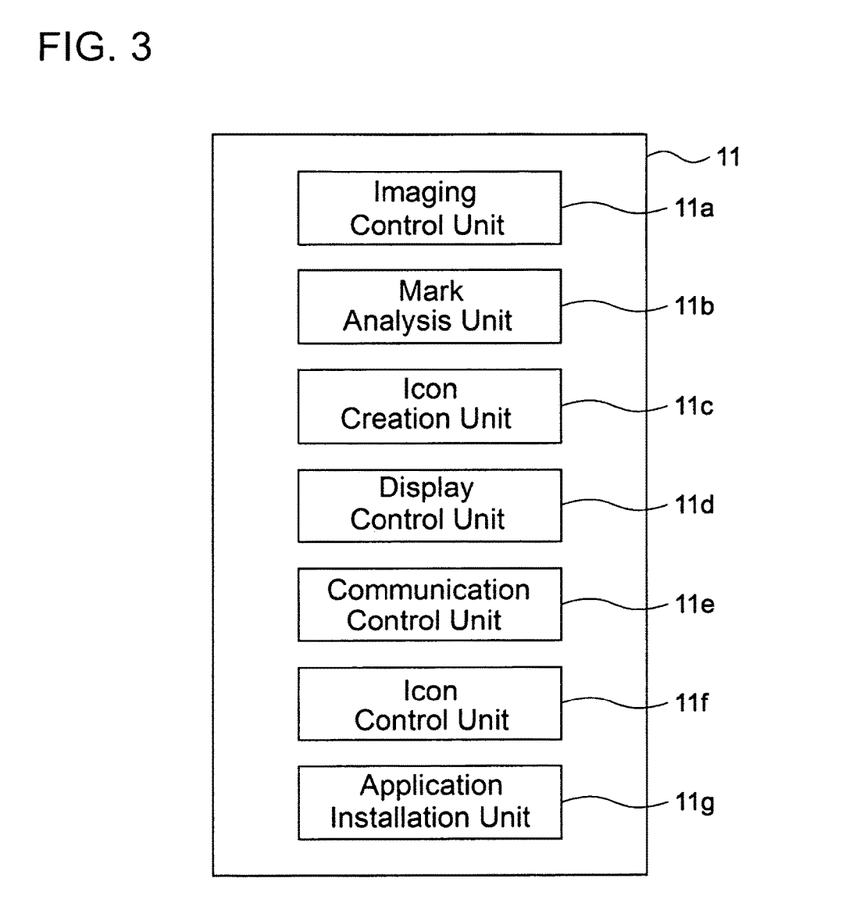
FIG. 3 illustrates functions achieved by program execution in a CPU.

Next, function blocks achieved by program execution in the CPU 11 will be described. FIG. 3 illustrates functions achieved by program execution in the CPU 11.

The function blocks that are achieved in the CPU 11 of the mobile terminal 100 include an imaging control unit (imaging control circuit) 11a, a mark analysis unit (mark analysis circuit) 11b, an icon creation unit (icon creation circuit) 11c, a display control unit (display control circuit) 11d, a communication control unit (second communication control circuit) 11e, and an icon control unit (icon control circuit) 11f. An application installation unit (application installation circuit) 11g may be included. The CPU 11 performs the processes as respective function blocks by program execution.

The imaging control unit 11a controls to cause the imaging unit 19 to image the mark generated to be outputted by the group management server 200.

The mark analysis unit 11b analyzes the information contained in the imaged mark and extracts an address to access to the group management server 200, the group ID of the group to join, or similar information.

The icon creation unit 11c creates an icon to be displayed on the display unit 16 of the mobile terminal 100 based on analysis results of the imaged mark. The icon has the information extracted by analysis embedded in it.

The display control unit 11d displays the created icon on the display unit 16.

The communication control unit 11e controls the network interface unit 15 to transmit the user ID 17a of the user who has captured the mark to the group management server 200 and causes the group management server 200 to register the user who has captured the mark to the group indicated by the mark.

As the user performs the operation to drag and drop the file with respect to the icon that is displayed on the screen of the display unit 16 and indicates the specific group, the icon control unit 11f places the file being operated into the shared folder on the file server 500. As the user deletes the icon indicating the specific group from the screen of the display unit 16, the icon control unit 11f sends a message requesting the group management server 200 to deregister the user from the specific group and remove the access right to the shared folder for the specific group.

If the application installation unit 11g is included, the application installation unit 11g downloads as necessary and installs programs that function as the above-described respective function blocks other than the application installation unit 11g into the mobile terminal 100 when the user first images the mark on one of the screen and the printed matter with the imaging unit 19 of the mobile terminal 100.

Up to this point, the configuration of the mobile terminal 100 has been described.

Configuration of Group Management Server 200

Figure 4:
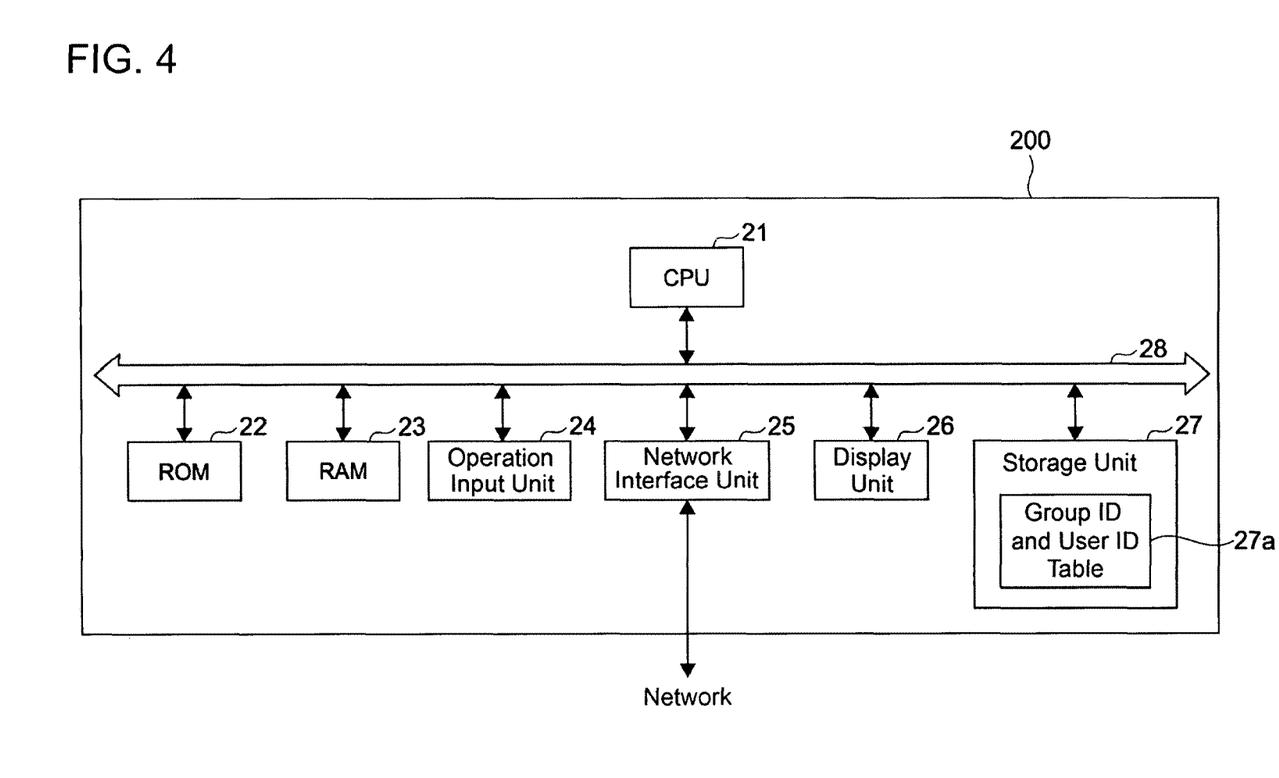
FIG. 4 illustrates a configuration for a group management server constituted of a general-purpose computer.

Next, a configuration of the group management server 200 will be described. The group management server 200 may consists of dedicated hardware or software, and may also be constituted of a general-purpose computer. FIG. 4 illustrates a configuration for the group management server 200 constituted of a general-purpose computer.

As illustrated in FIG. 4, the group management server 200 includes a CPU 21, a ROM 22, a RAM 23, an operation input unit 24, a network interface unit (first communication circuit) 25, a display unit 26, and a storage unit (first storage circuit) 27. These blocks are each connected via a bus 28.

The description of the blocks similar to those of the mobile terminal 100 among the respective blocks is omitted.

The storage unit 27 stores a group ID and user ID table 27a for managing the user who joins the group for each group.

Figure 5:
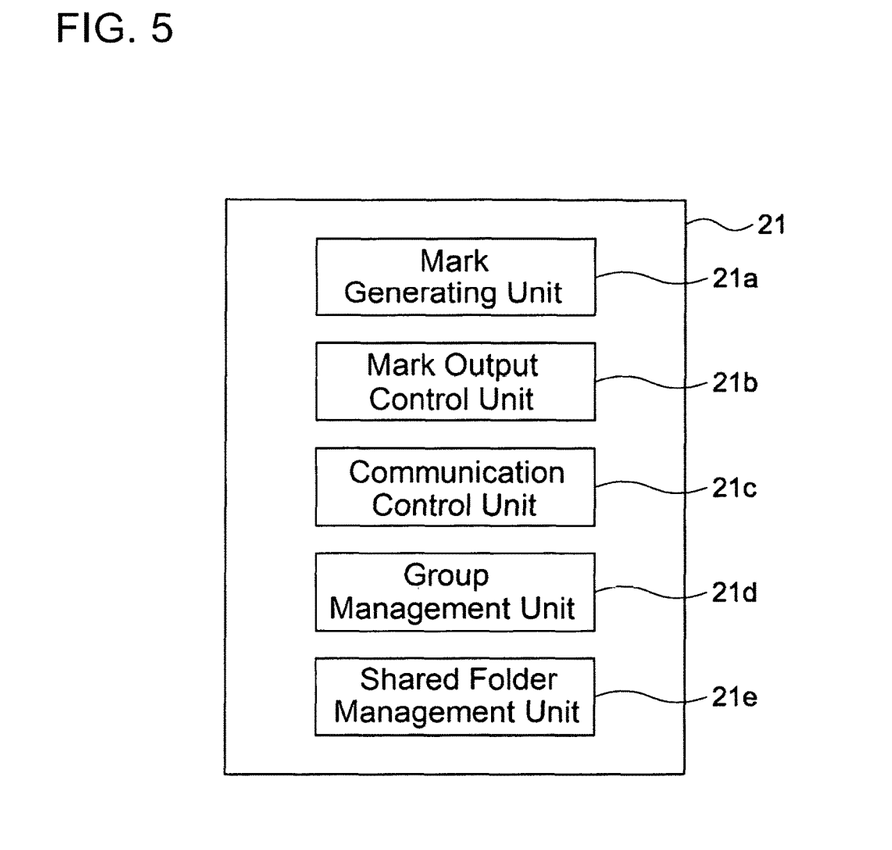
FIG. 5 illustrates functions achieved by program execution in a CPU.

Next, function blocks achieved by program execution in the CPU 21 will be described. FIG. 5 illustrates functions achieved by program execution in the CPU 21.

The function blocks that are achieved in the CPU 21 of the group management server 200 include a mark generating unit (mark generating circuit) 21a, a mark output control unit (mark output control circuit) 21b, a communication control unit (first communication control circuit) 21c, a group management unit (group management circuit) 21d, and a shared folder management unit (shared folder management circuit) 21e. The CPU 11 performs the processes as respective function blocks by program execution.

The mark generating unit 21a generates the mark containing the information such as the specific group ID, the address of the group management server 200, and the address to the file server that creates the shared folder for its group based on an instruction from an administrator managing the group.

The mark output control unit 21b mainly causes the print apparatus 300 to print the mark, and the projector 400 to project the mark.

The communication control unit 21c controls the network interface unit 25 to communicate the information with the mobile terminal 100, the file server 500, or a similar resource.

The group management unit 21d mainly creates a new group based on an instruction from the administrator, and adds the user to or removes the user from the specific group in response to a request from the mobile terminal 100.

The shared folder management unit 21e mainly creates the shared folder on the file server 500, and set or changes an access right for each user to the created shared folder.

Up to this point, the configuration of the group management server 200 has been described.

Screen Example

Figure 6:
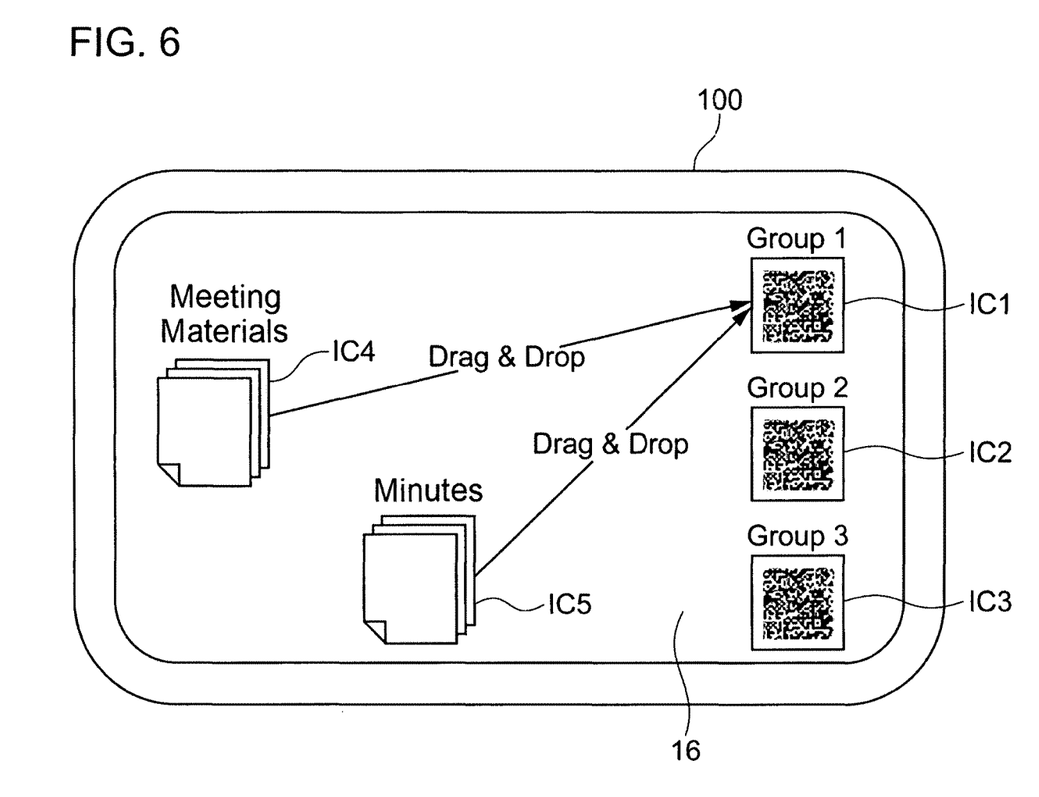
FIG. 6 illustrates a screen example where icons generated from imaged marks are displayed on a display unit of a mobile terminal.

Next, a screen example of which the icons generated from the imaged marks are displayed on the display unit 16 of the mobile terminal 100 will be described. FIG. 6 illustrates a screen example where the icons generated from the imaged marks are displayed on the display unit 16 of the mobile terminal 100.

In the screen example illustrated in FIG. 6, three icons of IC1, IC2, and IC3 are displayed on the right side of the screen. As the names displayed above the respective icons suggest, the icons of IC1, IC2, and IC3 indicate Group 1, Group 2, and Group 3, respectively.

This shows that: the user having the mobile terminal 100 joins the three groups of Group 1, Group 2, and Group 3; and these three groups have the access right to the shared folders shared by the respective groups.

The respective icons of IC1, IC2, and IC3 are designed to be the marks that contains the information such as the group ID, the address of the group management server, and the address of the file server 500 in the same manner as the mark first generated by the group management server 200.

As the user performs the operation to drag and drop the icons such as an icon IC4 indicating meeting materials and an icon IC5 indicating minutes with respect to the icon IC1 indicating the Group1 on the screen, the meeting materials and the minutes are stored in the shared folder of the Group1.

Up to this point, the screen example of which the icons generated from the imaged marks are displayed on the display unit 16 of the mobile terminal 100 has been described.

Flow of Processes

Next, a flow of the processes in the information sharing system 1 will be described. The flow of the processes in the information sharing system 1 will be categorized into following three processes to be described: processes from imaging a mark to join a group to obtaining an access right to a shared folder; processes to access to a shared folder with a displayed icon; and processes to leave a group.

In these flow charts, the description will be given of the following flows as examples: a meeting organizer A creates a group and a mark to share meeting materials with meeting participants; a user B who has attended the meeting joins the group; and subsequently a user C who has not attended the meeting is invited to join the group by the user B; the user C captures the icon on the screen of the mobile terminal 100 belonging to the user B to join the group; and both user B and user C leave the group afterwards.

1. Processes from Imaging Mark to Joining Group

Figure 7:
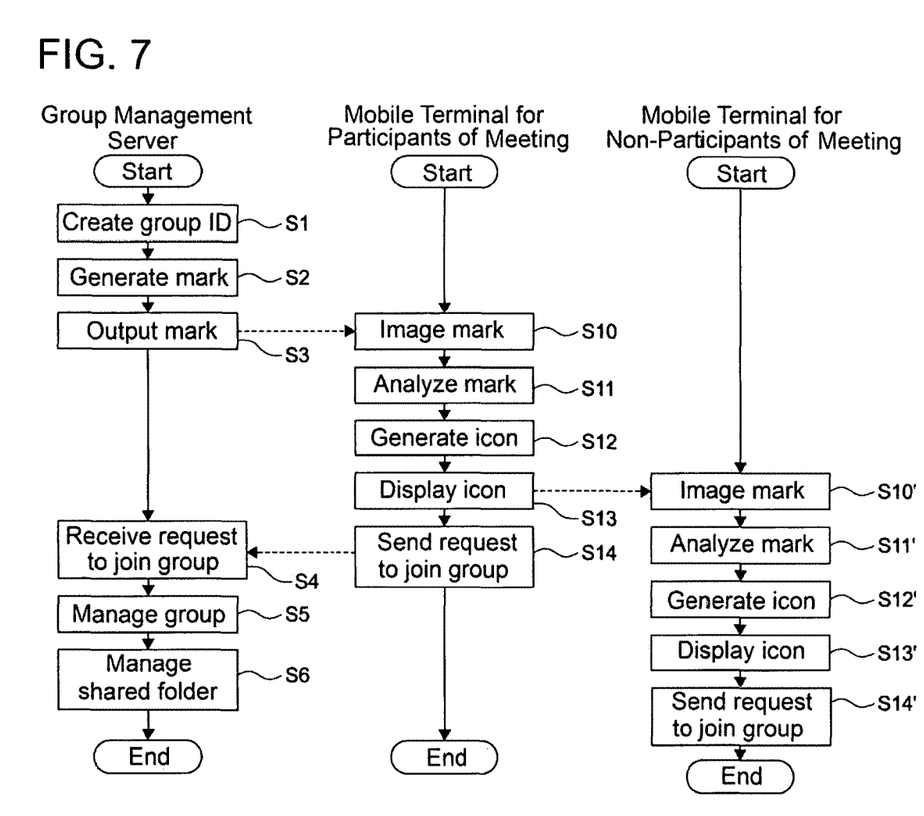
FIG. 7 illustrates flow of processes from imaging a mark to join a group to obtaining an access right to a shared folder.

FIG. 7 illustrates flow of processes from imaging a mark to join a group to obtaining an access right to a shared folder.

First, the mark generating unit 21a of the group management server 200, based on an instruction from the meeting organizer A, creates the group ID of the group, and creates the shared folder for this group on the file server 500 (Step S1). At this juncture, the meeting organizer A may upload the files such as materials desired to be shared during the meeting to the shared folder.

Next, the mark is generated, which contains the information such as the group ID created by the mark generating unit 21a, the address of the group management server 200, and a Uniform Resource Locator (URL) of the shared folder (Step S2).

Next, the mark output control unit 21b output the generated mark via one of the print apparatus 300 and the projector 400 (Step S3). The user B may capture the mark printed on the meeting materials when the mark is outputted from the print apparatus 300. The user B may capture the mark projected on the screen when the mark is outputted from the projector 400.

Next, the user B provides instruction to the imaging control unit 11a of his or her own mobile terminal 100. Subsequently, the imaging unit 19 images the mark outputted in the previous step (Step S10).

Next, the mark analysis unit 11b analyzes the imaged mark (Step S11).

Next, the icon creation unit 11c creates an icon based on the analysis results (Step S12).

Next, the display control unit 11d displays the created icon on the screen of the display unit 16 (Step S13).

Here, the icon, which is displayed on the screen of the mobile terminal 100 belonging to the user B, is later imaged by the user C with the mobile terminal 100 belonging to the user C. Consequently, the user C joins the group. The flow of these processes is similar to those of the mobile terminal 100 of the user B, and therefore will not be further described.

The information contained in the mark may be transmitted between the mobile terminal of the user B and the mobile terminal of the user C by wireless communications such as infrared communication and short-range wireless communication, instead of the user C imaging the mark.

Next, the icon control unit 11f provides instruction to the communication control unit 11e for transmitting the user ID 17a of the user B, which the mobile terminal 100 of the user B stores, to the group management server 200 via the network interface unit 15. Subsequently, the icon control unit 11f requests to cause the user B to join the group (Step S14).

Next, the group management unit 21d of the group management server 200 accepts the request for the user B to join the group from the mobile terminal 100 of the user B via the communication control unit 21c (Step S4).

Next, the group management unit 21d causes the user B to join the group (Step S5).

Next, the shared folder management unit 21e set an access right for the user B on the shared folder on the file server 500 (Step S6).

The flow of processes from the user B joining the group to obtaining the access right to the shared folder is described above.

2. Processes to Access to Shared Folder with Displayed Icon

Figure 8:
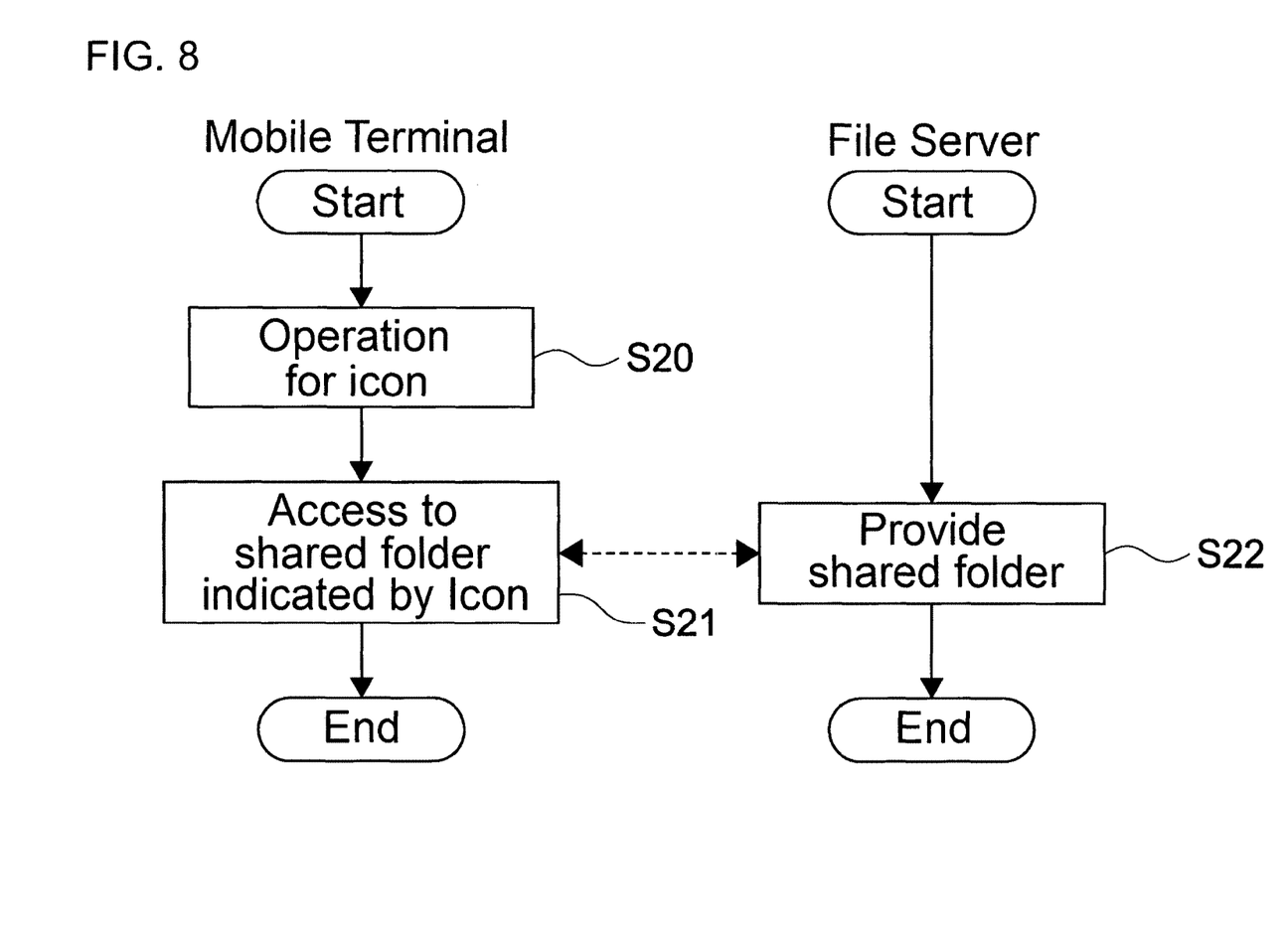
FIG. 8 illustrates flow of processes to access to a shared folder with a displayed icon.

FIG. 8 illustrates flow of processes to access to the shared folder with the displayed icon. For example, the user B may upload the created minutes to the shared folder at this juncture.

The user B performs the operation to use the displayed icon of the group such as to drag and drop the file to the icon, on the mobile terminal 100 belonging to the user B (Step S20).

The icon control unit 11f accesses to the shared folder on the file server to perform the process (Step S21).

The file server 500 provides the services for the shared folder (Step S22).

The flow of the processes to access to the shared folder with the displayed icon is described above.

3. Processes Required up to Leaving Group

Figure 9:
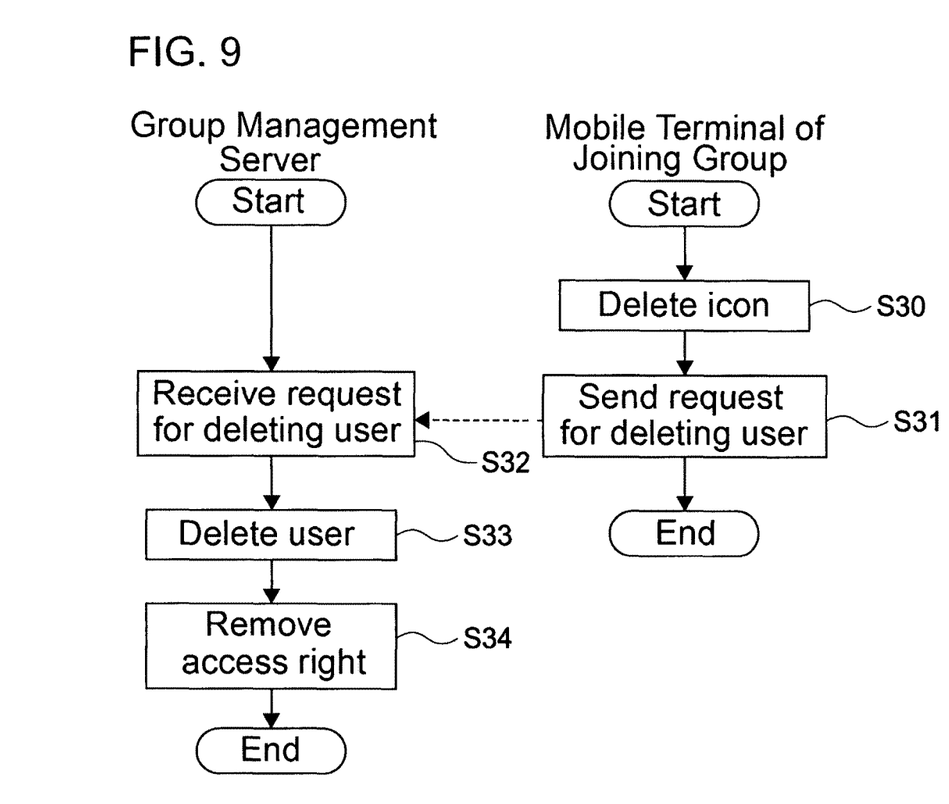
FIG. 9 illustrates flow of processes for a user to leave a group.

FIG. 9 illustrates flow of processes for the user B to leave the group. The same applies to the user C, and therefore no additional description of the user C will be provided.

First, the user B deletes the icon indicating the group, which is displayed on the screen of the mobile terminal 100 belonging to the user B (Step S30).

Next, the icon control unit 11f sends a request for deleting the user B to the group management server 200 (Step S31).

Next, the group management unit 21d of the group management server 200 receives the request for deleting the user B via the network interface unit 25 (Step S32).

Next, the group management unit 21d deletes the user ID 17a of the user B from the relevant group in the group ID and user ID table 27a (Step S33).

Next, the shared folder management unit 21e removes the access right for the user B from the shared folder on the file server 500 (Step S34).

The flow of the processes for the user B to leave the group is described above.

The flow of the processes in the information sharing system 1 has been described as above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information sharing system, comprising:
a group management server; and
at least one terminal; wherein
the group management server includes
a first storage circuit,
a first communication circuit,
a mark generating circuit that, based on an instruction from an administrator that creates a group sharing a shared folder on a file server, generates a group ID for uniquely identifying the group and causes the first storage circuit to store the group ID, and generates as optically scannable information a mark containing at least the group ID, an address of the group management server, and an address of the file server,
a mark output control circuit that causes at least either printed or digitally projected output of the generated mark in optically scannable form,
a first communication control circuit that controls the first communication circuit to communicate with the at least one terminal and the file server,
a group management circuit that manages the created group, and
a shared folder management circuit that manages an access right to the shared folder shared by the group;
the terminal includes
an image-capturing circuit,
a display circuit including a screen,
an operation input circuit,
a second storage circuit that stores a user ID for uniquely identifying a user of the terminal,
a second communication circuit,
an imaging control circuit that, based on an instruction from the user, given via the operation input circuit, causes the image-capturing circuit to digitally image-capture the outputted mark,
a mark analysis circuit that analyzes the digitally image-captured mark,
an icon creation circuit that based on the analysis results creates an icon containing, as optically scannable information, at least the group ID, the address of the group management server, and the address of the file server,
a display control circuit that displays the created icon on of the display-circuit screen,
a second communication control circuit that controls the second communication circuit to communicate with the group management server and the file server, and based on the analysis results sends a request to allow the user ID stored in the second storage circuit to join the group indicated by the group ID, and
an icon control circuit that accesses the shared folder through a screen-based user operation on the icon as displayed on the display-circuit screen by the display control circuit;
the group management circuit of the group management server, on receiving the request from the terminal, manages the received user ID by associating the user ID with the group ID stored in the first storage circuit;
the shared folder management circuit of the group management server, on receiving the request from the terminal, sets an access right to the shared folder for the received user ID; and
the group management server instructs the file server to set an access right to the shared folder for the user ID.

2. The information sharing system according to claim 1, wherein the user who has not joined the group images the icon with the imaging circuit so as to join the group, the icon being displayed on the display circuit of the terminal of the user having joined the group.

3. The information sharing system according to claim 1, wherein the mark output control circuit of the group management server causes a print apparatus to print the generated mark.

4. The information sharing system according to claim 1, wherein the mark output control circuit of the group management server causes a projector to project the generated mark on the screen.

5. The information sharing system according to claim 1, wherein the terminal includes an application installation circuit that downloads a program functioning as the mark analysis circuit and the icon creation circuit so as to install the program into the terminal when the mark has been first imaged by the terminal.

6. The information sharing system according to claim 1, wherein:
the terminal further includes an icon control circuit that sends the request for deregistration of the user of the terminal from the group to the group management server via the second communication circuit when the icon displayed on the screen of the display circuit is deleted; and
when the group management server receives the request for the deregistration of the user from the group, the group management circuit deletes the user ID of the user being associated with the group ID stored in the second storage circuit, the shared folder management circuit removes the access right for the user from the shared folder.

7. A non-transitory computer-readable recording medium storing an information sharing program, the information sharing program causing:
a group-management server computer managing a group sharing a shared folder on a file server to perform procedures to
generate, based on an instruction to create the group, a group ID for uniquely identifying the group;
cause a group-management server storage circuit to store the generated group ID;
generate as optically scannable information a mark that contains at least the generated group ID, an address of the group-management server computer itself, and an address of the file server;
cause at least either printed or digitally projected output of the generated mark in optically scannable form;
receive a request to allow a user ID to join the group indicated by the generated group ID, from a terminal having digitally image-captured the at least either printed or digitally projected mark, the user ID uniquely identifying a user of the terminal;
manage the received user ID by associating the user ID with the generated group ID stored in the storage circuit, based on the request from the terminal;
set an access right to the shared folder for the received user ID, based on the request from said terminal; and
instruct the file server to set an access right to the shared folder for the user ID; and a computer in said terminal to perform procedures to
cause an image-capturing circuit in said terminal to digitally image-capture said mark;
analyze the digitally image-captured optically scannable mark;
create, based on the analysis results, an icon containing the optically scannable information in said mark;

cause a display control circuit in said terminal to display the created icon on a display-circuit screen in said terminal;

based on the analysis results, transmit the user's user ID to the group-management server, the user's user ID being stored in a storage circuit in the terminal, and send to the group-management server the request to allow the user's user ID to join the group indicated by the group ID: and access the shared folder through a screen-based user operation on the icon as displayed on the display-circuit screen by the display control circuit.

* * * * *